United States Patent
Lattner et al.

(10) Patent No.: US 6,846,405 B2
(45) Date of Patent: Jan. 25, 2005

(54) CIRCULATING FLUID BED REACTOR SYSTEM

(75) Inventors: James R. Lattner, Seabrook, TX (US); Jeffrey S. Smith, Seabrook, TX (US); Rathna P. Davuluri, Fairfax, VA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 508 days.

(21) Appl. No.: 09/943,821

(22) Filed: Aug. 31, 2001

(65) Prior Publication Data

US 2003/0044327 A1 Mar. 6, 2003

(51) Int. Cl.[7] ............................ C10G 11/00; C07C 1/20
(52) U.S. Cl. ...................... 208/153; 208/156; 208/113; 208/161; 208/DIG. 1; 585/640
(58) Field of Search ................................. 208/153, 156, 208/113, 161, DIG. 1; 585/640

(56) References Cited

U.S. PATENT DOCUMENTS

| | | | |
|---|---|---|---|
| 3,355,380 A | * 11/1967 | Luckenbach | 208/153 |
| 3,644,199 A | * 2/1972 | Evans et al. | 208/120.1 |
| 3,957,443 A | * 5/1976 | Strickland et al. | 422/145 |
| 3,959,117 A | * 5/1976 | Bunn et al. | 208/113 |
| 4,035,284 A | 7/1977 | Gross et al. | 208/120 |
| 4,495,063 A | 1/1985 | Walter et al. | 208/113 |
| 4,664,888 A | 5/1987 | Castagnos, Jr. | 422/147 |
| 5,552,120 A | 9/1996 | Sechrist et al. | 422/144 |

FOREIGN PATENT DOCUMENTS

GB 2 11 848 7/1983 ............. B01J/8/22

* cited by examiner

Primary Examiner—Walter D. Griffin

(57) ABSTRACT

This invention is to a circulating fluid bed reactor that is designed so as to have the ability to adjust catalyst holdup within the reaction zone of the reactor while maintaining substantially constant catalyst circulation rate through the reaction zone. The ability to adjust catalyst hold up independently of catalyst circulation rate provides an advantage of having the ability to maintain a constant conversion level as catalyst activity or feed rates change.

9 Claims, 2 Drawing Sheets

CIRCULATING FLUID BED REACTOR SYSTEM

FIELD OF THE INVENTION

This invention is in the field of circulating fluid bed reactors.

BACKGROUND OF THE INVENTION

Circulating fluid bed reactors have a variety of uses in commercial scale chemical processing. For example, circulating fluid bed reactors are used in catalytic cracking processes.

The design of circulating fluid bed reactors have become of particular importance in fluid catalytic cracking processes with the advent of highly active catalytic cracking catalysts. A concern in designing such reactors is the ability to quickly and effectively separate reacted products from active catalyst within the reaction zone.

U.S. Pat. No. 4,035,284, for example, discloses a circulating fluid bed reactor system having a reaction zone that has a hydrocarbon residence time of 0.5 to 10 seconds. The reaction product is initially separated from the catalyst exiting the reaction zone by contacting plates that extend from the exit of the reaction zone.

U.S. Pat. No. 4,664,888 discloses a circulating fluid bed reactor system having a reaction zone that has a hydrocarbon residence time of 0.2 to 10 seconds. At the exit of the reaction zone is a separation device for separating catalyst from product. The device is semicircular and designed to use centrifugal force to separate the catalyst from the product.

Circulating fluid bed reactors are also likely to be used in the commercial scale operation of converting methanol or dimethyl ether to olefins. Currently, little is known about how to operate these types of reaction systems at commercial scale. However, it is likely that highly active molecular sieve catalysts will be used, and the ability to control such systems will be very important.

In operating highly active catalyst systems, limited ability to control the operation of commercial scale reactor systems is available. Known systems are typically designed to accommodate a certain content of catalyst and a certain throughput of feed. In general, the ability to control the amount of catalyst in the reaction zone is intimately associated with the amount of catalyst that can be circulated through the system, and the amount of feed that can flow through the reactor. In systems that use new and/or highly active catalysts, it would be advantageous to have the ability to independently control such parameters so as to enhance the ability to produce the desired product.

SUMMARY OF THE INVENTION

This invention provides the ability to control various parameters independently in continuous commercial scale reactors. Specifically, the invention provides a method for adjusting catalyst holdup in a circulating fluid bed reactor. The method involves flowing vapor feed and catalyst through a reaction zone of a circulating fluid bed reactor to convert the vapor feed to a vapor product. The vapor product and the catalyst are contacted with a separation means to separate the catalyst from the product, and the position of the separation means is adjusted to increase or decrease catalyst holdup within the reaction zone while maintaining a substantially constant catalyst circulation rate through the reaction zone.

In one embodiment, the reaction zone is operated at a weight hourly space velocity of from about 2 $hr^{-1}$ to about 1000 $hr^{-1}$. According to the invention, the weight hourly space velocity can be adjusted by increasing or decreasing catalyst hold up while keeping feed flow substantially constant.

In another embodiment, the vapor feed and catalyst are initially contacted and flowed through the reaction zone at a catalyst to feed weight ratio of from about 2:1 to about 100:1. According to the invention, catalyst hold up can be adjusted without substantially impacting catalyst to feed ratio.

The invention is useful for a variety of circulating fluid bed reactors having a variety of flow regimes. Useful flow regimes include a vapor flow rate through the reaction zone of from about 2 m/sec. to about 50 m/sec.

The invention also includes a circulating fluid bed reactor. The reactor includes a reaction zone having an inlet and outlet; and a separation means apart from the reaction zone outlet for increasing or decreasing catalyst holdup within the reaction zone while maintaining substantially constant catalyst circulation rate through the reaction zone. In one embodiment, the separation means is an impingement plate, and the impingement plate is coupled to a means for increasing or decreasing distance between the impingement plate and an outlet of the reaction zone.

BRIEF DESCRIPTION OF THE DRAWINGS

Various embodiments of the overall invention are shown in the attached drawings, wherein.

DETAILED DESCRIPTION OF THE INVENTION

Figure 1:
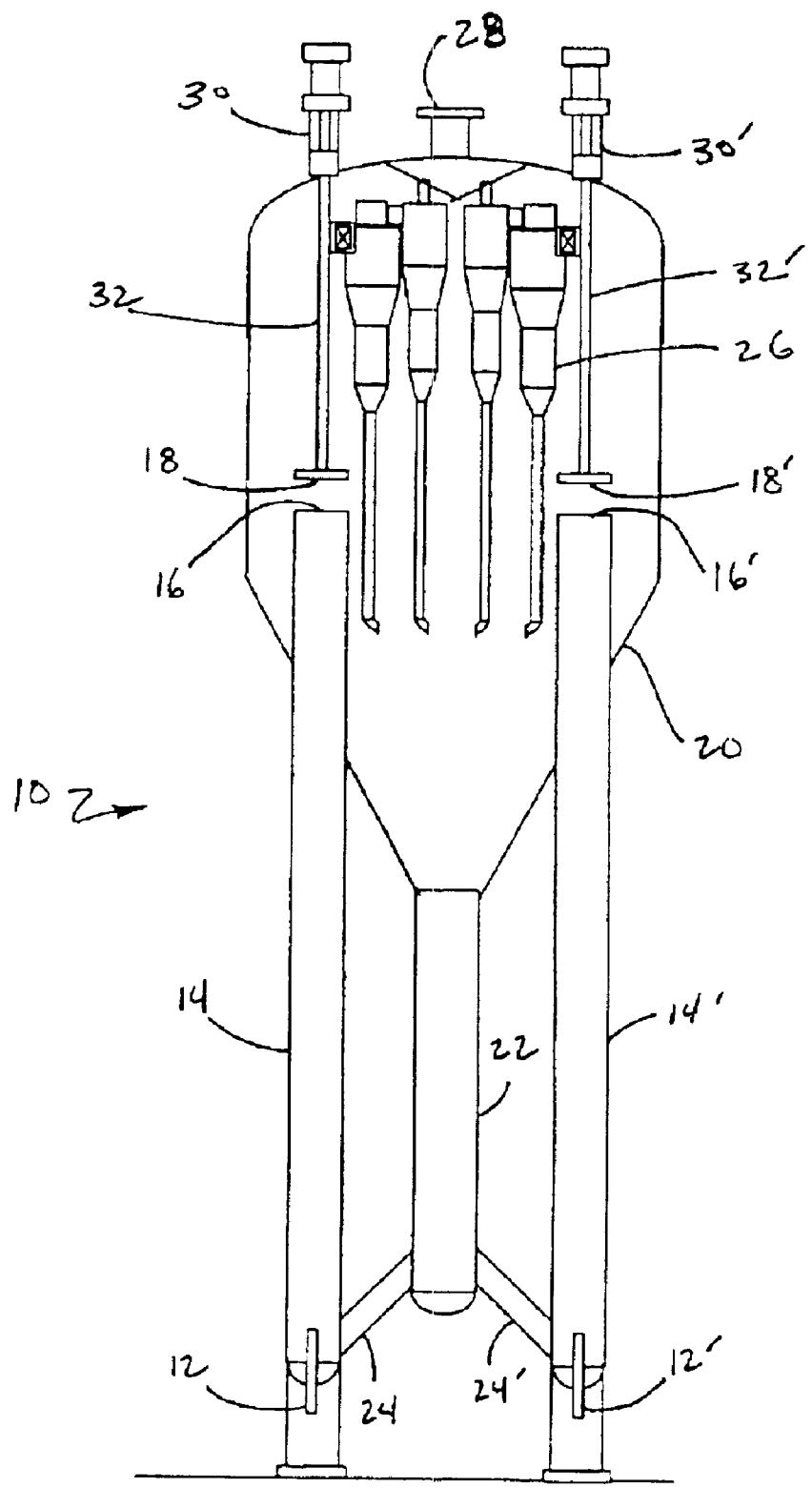
FIG. 1 is an overall view of a circulating fluid bed reactor, incorporating a riser type reaction zone.

In a circulating fluid bed reactor, catalyst and feed flow through the reactor, and the feed is converted by contact with the catalyst to a product. The amount of catalyst that is contained within the reaction zone of a circulating fluid bed reactor is generally referred to as catalyst holdup.

This invention provides the ability to independently adjust catalyst holdup in a circulating fluid bed reactor. Specifically, the invention provides a means for adjusting catalyst hold up in the reaction zone of a circulating fluid bed reactor while maintaining substantially constant catalyst circulation rate through the reaction zone. This means that product quality is predominantly affected by change in catalyst hold up rather than catalyst circulation rate. When catalyst hold up is changed, it is desirable that catalyst circulation rate be maintained within plus or minus 25% of its rate prior to catalyst hold up adjustment. Preferably catalyst circulation rate is to be maintained within plus or minus 15% of its rate prior to catalyst hold up adjustment; more preferably within about plus or minus 10%.

The ability to adjust catalyst hold up independently of catalyst circulation rate provides an advantage of having the ability to maintain a conversion level as catalyst activity or feed rates change. This ability is particularly advantageous when operating with new and highly active catalysts, and allows the ability to adjust ongoing operations parameters when catalyst is changed during operation.

According to the invention, vapor feed and catalyst are input to a reaction zone of a circulating fluid bed reactor. The feed and catalyst flow through the reaction zone, with the feed and catalyst contacting one another, and the feed being converted into product.

The converted feed and catalyst exit the reaction zone through at least one exit, and are separated by contacting a separation means. The separation means can be of conventional shape or type. However, the separation means has the ability to be moved during operation to change the exit configuration of the reaction zone, thereby affecting catalyst hold up. This means that movement of the separation means either increases or decreases the amount of catalyst in the reaction zone at a given period of time.

The ability to control catalyst hold up, also provides an ability to control weight hourly space velocity (WHSV) while maintaining a substantially constant feed flow. The ability to control WHSV is important to the extent that too high a WHSV can result in a low conversion of feed to product and too high can result in "over-conversion." Over-conversion is typically involves keeping desired product in contact with catalyst for an extended period of time such that substantial side reactions occur.

Desirably, the reactor is operated so that feed contacts catalyst at a weight hourly space velocity (WHSV) of from about 2 $hr^{-1}$ to about 1000 $hr^{-1}$ preferably from about 10 $hr^{-1}$ to about 1000 $hr^{-1}$, and most preferably in the range of from about 20 $hr^{-1}$ to about 500 $hr^{-1}$. WHSV is defined herein as the weight of oxygenate, and hydrocarbon which may optionally be in the feed, per hour per weight of the molecular sieve content of the catalyst. Because the catalyst or the feedstock may contain materials, which act as inerts or diluents, the WHSV is calculated on the weight basis of the feed desired to be converted and the amount of active catalytic ingredients contained in the catalyst.

Catalyst circulation rate is the amount of catalyst that flows into and out of the reaction zone of the circulating fluid bed reactor. The amount of catalyst that is flowed into and out of the reaction zone is dependent upon the amount of feed that is to be reacted. Too much catalyst relative to the amount of feed contacted can result in over-conversion. Too little catalyst can result in too low a conversion. It is desirable in this invention that catalyst circulation rate be operated so as to obtain a weight ratio of catalyst to feed flowing to the reaction zone of from about 2:1 to about 100:1, preferably from about 3:1 to about 80:1; more preferably from about 5:1 to about 50:1; and most preferably from about 10:1 to about 40:1. These catalyst to feed ratios can also be referred to as catalyst to oil ratios.

The invention is suited to a wide range of vapor velocity flow through the reaction zone. A suitable vapor flow rate through the reaction zone is from about 1 m/sec. to about 50 m/sec. A flow rate of about 2 m/sec. to about 40 m/sec. is preferred, with a flow rate of about 3 m/sec. to about 40 m/sec. being more preferred, and a flow rate of about 5 m/sec. to about 30 m/sec. being most preferred.

The invention is particularly suited to commercial scale reaction systems that use highly active catalysts. Such systems include catalytic cracking of oil compositions and catalytic conversion of oxygenate compositions to olefins. Catalysts that are used in such systems are highly active zeolite and non-zeolite molecular sieves. Highly active zeolites include those containing ZSM-type zeolites. Highly active non-zeolites include silicoaluminophosphate (SAPO) molecular sieves.

Suitable silicoaluminophosphate molecular sieves include SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof. Preferred are SAPO-18, SAPO-34, SAPO-35, SAPO-44, and SAPO-47, particularly SAPO-18 and SAPO-34, including the metal containing forms thereof, and mixtures thereof. As used herein, the term mixture is synonymous with combination and is considered a composition of matter having two or more components in varying proportions, regardless of their physical state.

An aluminophosphate (ALPO) molecular sieve can also be included in the catalyst composition. Aluminophosphate molecular sieves are crystalline microporous oxides which can have an $AlPO_4$ framework. They can have additional elements within the framework, typically have uniform pore dimensions ranging from about 3 angstroms to about 10 angstroms, and are capable of making size selective separations of molecular species. More than two dozen structure types have been reported, including zeolite topological analogues. A more detailed description of the background and synthesis of aluminophosphates is found in U.S. Pat. No. 4,310,440, which is incorporated herein by reference in its entirety. Preferred ALPO structures are ALPO-5, ALPO-11, ALPO-18, ALPO-31, ALPO-34, ALPO-36, ALPO-37, and ALPO-46.

The ALPOs can also include a metal substituent in its framework. Preferably, the metal is selected from the group consisting of magnesium, manganese, zinc, cobalt, and mixtures thereof. These materials preferably exhibit adsorption, ion-exchange and/or catalytic properties similar to aluminosilicate, aluminophosphate and silica aluminophosphate molecular sieve compositions. Members of this class and their preparation are described in U.S. Pat. No. 4,567,029, incorporated herein by reference in its entirety.

ALPOs are particularly advantageous when combined with SAPO molecular sieves. They can be separately mixed with the SAPO molecular sieves, combined in a common matrix, or formed as an intergrowth material with the SAPO.

In one embodiment, the circulating fluid bed reactor of the invention functions as a reactor for converting oxygenate containing compositions to olefins. The oxygenate compositions comprises at least one organic compound which contains at least one oxygen atom, such as aliphatic alcohols, ethers, carbonyl compounds (aldehydes, ketones, carboxylic acids, carbonates, esters and the like). When the oxygenate is an alcohol, the alcohol can include an aliphatic moiety having from 1 to 10 carbon atoms, more preferably from 1 to 4 carbon atoms. Representative alcohols include but are not necessarily limited to lower straight and branched chain aliphatic alcohols and their unsaturated counterparts. Examples of suitable oxygenate compounds include, but are not limited to: methanol; ethanol; n-propanol; isopropanol; $C_4$–$C_{20}$ alcohols; methyl ethyl ether; dimethyl ether; diethyl ether; di-isopropyl ether; formaldehyde; dimethyl carbonate; dimethyl ketone; acetic acid; and mixtures thereof. Preferred oxygenate compounds are methanol, dimethyl ether, or a mixture thereof.

The oxygenate conversion process can generally be carried out at a wide range of temperatures. An effective operating temperature range can be from about 200° C. to 700° C., preferably from about 300° C. to 600° C., more preferably from about 350° C. to 550° C. At the lower end of the temperature range, the formation of the desired olefin products may become markedly slow. At the upper end of the temperature range, the process may not form an optimum amount of product.

An advantage of this invention is that catalyst hold up in the reaction zone can be independently controlled by controlling the exit configuration of the reaction zone. The exit can be controlled during operation, or between operation cycles without having to retrofit the reactor design. This type of control can be accomplished by providing a separation means which can be adjusted so as to change the distance between the separation means and the exit of the reaction zone.

One type of separation means that can be used in this invention is a moveable impingement plate. The plate can be of a variety of shapes, but should be adjustable so that it can be moved to change the distance between the point of impact of the plate and the exit point of the reaction zone. The distance between the exit of the riser and the impingement plate should be adjustable between 5% and 200% of the riser diameter. Preferably, the distance should be between 10% and 150% of the riser diameter, and most preferably between 15% and 100% of the riser diameter.

One type of circulating fluid bed reactor embodied by the concept of this invention is shown in FIG. 1, which depicts a dual riser type reactor 10. Feed and catalyst are injected into a riser inlets 12, 12', and flow through risers 14, 14'. In this embodiments, the risers act as the reaction zone.

As the feed and catalyst flow through risers 14, 14', the feed is converted to product. The product and catalyst exit the risers though riser exits 16, 16' and impact separation means 18, 18'. In this embodiment, separation means 18, 18' are shown as impingement plates. The impingement plates are substantially flat meaning that the defines a planar region. The plates are oriented over the riser exits and are generally perpendicular to the axis of the riser meaning that the plates are either perpendicular to the axis of the riser or no more than about 10° from perpendicular.

After contact with the separation means, separated catalyst drops into the reactor housing 20, and into a downcomer 22. Catalyst in the downcomer 22 can then be sent back to the risers 14, 14' by way of circulation lines 24, 24'. The catalyst can then contact additional feed that is injected into riser inlets 12, 12'.

Although not shown in the drawings, a portion of the separated catalyst can be removed from the reactor system and sent to a regenerator. This is desirable to remove carbonaceous material (i.e., coke) that builds on the catalyst during operation. Essentially, the coke is burned from the catalyst in the regenerator and the regenerated catalyst is sent back to the reactor for further contact with feed. The regenerated catalyst can be injected into riser inlets 12, 12' injected into circulation lines 24, 24', or injected directly into risers 14, 14'.

Product that is separated after contact with separation means 18, 18' moves upwardly to exit the reactor. In this embodiment, the product flows through cyclone separation means 26 to remove catalyst not initially removed by separation means 18, 18'. The product exits the cyclone separation means 26, eventually leaving the reactor housing 20 through exit port.

The distance between impingement plates 18, 18' and riser exits 16, 16' are independently controlled by control means 30, 30'. Control means 30, 30' are connected to impingement plates 18, 18' by shafts 32, 32'. The control means are operated such that the shafts move the impingement plates either toward or away from the riser exits. This movement affects catalyst hold up in the risers while catalyst circulation through the risers remains substantially constant. Feed flow rate through the risers can also be independently controlled as desired.

Figure 2A:
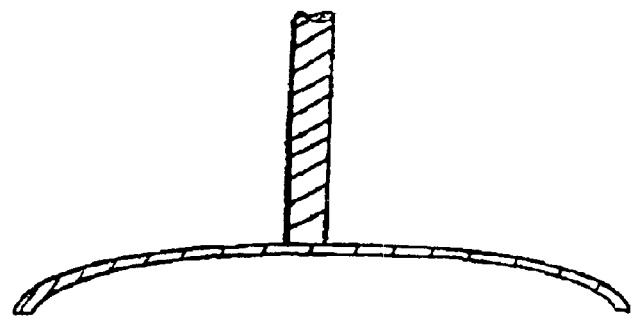
FIG. 2A is a concave shaped impingement plate.
Figure 2B:
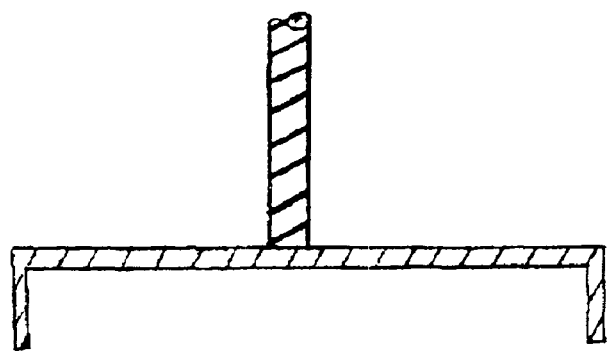
FIG. 2B is a flat impingement plate having lipped ends.
Figure 2C:
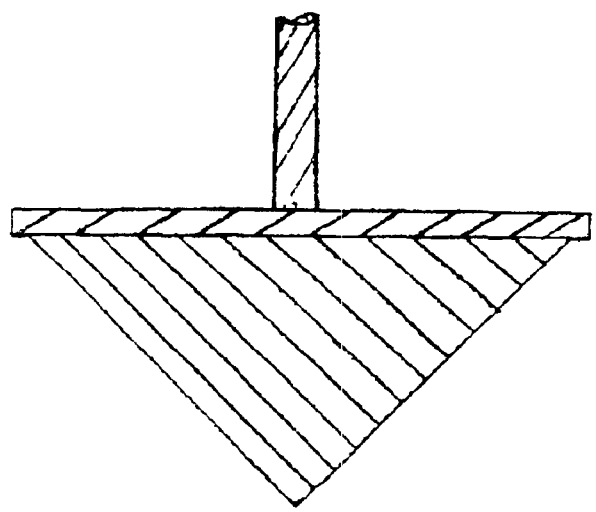
FIG. 2C is a conical shaped impingement plate.

FIGS. 2A–2C show alternative embodiments of the shape of the impingement plate. FIG. 2A shows a concave shape, as oriented toward the riser exits. FIG. 2B shows an impingement plate that is substantially flat and having lipped ends. FIG. 2C shows an impingement plate with a conical projection.

Having now fully described this invention, it will be appreciated by those skilled in the art that the invention can be performed within a wide range of parameters within what is claimed, without departing from the spirit and scope of the invention.

What is claimed is:

1. A method for adjusting catalyst holdup in a circulating fluid bed reactor, comprising:

flowing vapor feed and catalyst through a reaction zone of a circulating fluid bed reactor to convert the vapor feed to a vapor product;

contacting the vapor product and the catalyst with a separation means to separate the catalyst from the product; and adjusting the position of the separation means to increase or decrease catalyst holdup within the reaction zone while maintaining a substantially constant catalyst circulation rate through the reaction zone.

2. The method of claim 1, wherein the catalyst circulation rate is maintained to within plus or minus 25% while the position of the separation means is adjusted.

3. The method of claim 2, wherein the catalyst circulation rate is maintained to within plus or minus 15% while the position of the separation means is adjusted.

4. The method of claim 3, wherein the catalyst circulation rate is maintained to within plus or minus 10% while the position of the separation means is adjusted.

5. The method of claim 1, wherein the reaction zone is operated at a weight hourly space velocity of at least 1 $hr^{-1}$.

6. The method of claim 5, wherein the reaction zone is operated at a weight hourly space velocity of at least 2 $hr^{-1}$.

7. The method of claim 6, wherein the reaction zone is operated at a weight hourly space velocity of at least 10 $hr^{-1}$.

8. The method of claim 1, wherein the vapor feed and catalyst are initially contacted and flowed through the reaction zone at a catalyst to feed weight ratio of from 2:1 to 100:1.

9. The method of claim 1, wherein the flow of vapor through the reaction zone has a flow rate of 2–50 m/sec.

* * * * *